United States Patent [19]

Kuwazuru et al.

[11] Patent Number: 4,579,774
[45] Date of Patent: Apr. 1, 1986

[54] REINFORCED LAMINATE

[75] Inventors: Issei Kuwazuru, Hasuta; Rikuo Ikemoto, Katano; Kozo Yada, Shiga, all of Japan

[73] Assignees: Sekisui Kagaku Kogyo Kabushiki Kaisha, Osaka; Toyota Jidosha Kabushiki Kaisha, Aichi, both of Japan

[21] Appl. No.: 666,377

[22] Filed: Oct. 30, 1984

[51] Int. Cl.⁴ .......................... B32B 5/16; B32B 5/18
[52] U.S. Cl. ................................. 428/290; 428/304.4; 428/319.7
[58] Field of Search .............. 428/285, 287, 288, 298, 428/301, 302, 303, 313.5, 314.4, 314.8, 319.1, 428/290, 319.7, 304.4

[56] References Cited

U.S. PATENT DOCUMENTS

| | | | |
|---|---|---|---|
| 3,503,841 | 3/1970 | Sterrett | 428/319.1 |
| 4,472,243 | 9/1984 | Bondoc et al. | 428/301 |
| 4,476,183 | 10/1984 | Holtrop et al. | 428/319.7 |
| 4,489,126 | 12/1984 | Holtrop et al. | 428/319.7 |

Primary Examiner—William J. Van Balen
Attorney, Agent, or Firm—Wenderoth, Lind & Ponack

[57] ABSTRACT

A reinforced laminate comprising
(a) a foamed styrene resin sheet layer, and
(b) thermoplastic resin layers reinforced with a mixture of glass fibers and organic fibers and laminated on both surfaces of the sheet layer (a). This laminate is suitable for use as a core material of a ceiling liner of an automobile.

23 Claims, No Drawings

REINFORCED LAMINATE

This invention relates to a light-weight laminate, and more specifically, to a light-weight reinforced laminate based on a foamed styrene resin sheet which is suitable for use as a core of a lining material for the ceilings of automobiles.

Recently, the use of laminate was proposed for light weight. But conventional internal trimming materials for automobiles, especially the lining materials of ceilings, are a laminate of a foamed polyethylene sheet and a vinyl chloride resin leather. This laminate, however, has defects. For example, when it is to be molded, the entire foamed sheet must be heated, and the molding operation is time-consuming. Furthermore, since its heat resistance and mechanical strength are low, the ceiling liner material will sag when the inside of an automobile attains a reduced pressure condition at high temperatures or during running.

Japanese Laid-Open Utility Model Publication No. 129362/1981 discloses a ceiling liner for automobiles comprising a laminate composed of a foamed thermoplastic resin sheet and paper sheets or thermoplastic resin films laminated to both surfaces thereof, the paper or film on one surface and the foamed thermoplastic resin sheet having many small holes extending therethrough and the paper or film on the other surface closing said small holes. Since in molding this liner, it must be entirely heated, the molding operation is time-consuming, and molding of subtle configurations cannot be effected. Furthermore, since this liner has low heat resistance and mechanical strength, it will sag when the inside of an automobile attains a reduced pressure condition at high temperatures or during running.

We previously proposed a laminate composed of a foamed styrene resin sheet and glass fiber-reinforced thermoplastic resin films laminated to both surfaces thereof (Japanese Utility Model Publication No. 15035/1983) as a core material of a ceiling liner for automobiles which eliminated the aforesaid defects.

This laminate has excellent heat resistance and mechanical strength, but has the defect that because of the presence of glass fiber-reinforced films on both sides of the foamed sheet, it is relatively heavy and has poor moldability under heat.

It is a principal object of this invention therefore to provide a laminate which is a further improvement over the previously proposed laminate and is light in weight and has good moldability under heat, excellent heat resistance and high mechanical strength.

Another object of this invention is to provide a core material for a ceiling liner of automobiles which is formed of such a reinforced laminate.

Other objects and advantages of this invention will become more apparent from the following description.

According to this invention, there is provided a reinforced laminate comprising (a) a foamed styrene resin sheet layer, and (b) thermoplastic resin layers reinforced with a mixture of glass fibers and organic fibers and laminated to both surfaces of the foamed sheet layer (a).

The structure of the laminate of this invention will be described below in more detail.

Foamed Styrene Resin Sheet Layer (a)

The styrene resin constituting the foamed sheet layer (a) includes homopolymers of styrene or its derivatives, and copolymers composed of a major proportion of units of styrene or its derivatives and a minor proportion of units of at least one other comonomer. Examples of the styrene drivatives are alpha-methylstyrene, vinyltoluene, chlorostyrene and dimethylstyrene. Example of the other comonomer which can be copolymerized with styrene or its derivatives include acrylates or methacrylates such as methyl acrylate, methyl methacrylate, ethyl acrylate, ethyl methacrylate, butyl acrylate and propyl methacrylate; acrylonitrile and methacrylonitrile; unsaturated dicarboxylic acids or anhydrides thereof, such as maleic acid, itaconic acid, fumaric acid and maleic anhydride; unsaturated monocarboxylic acids such as acrylic acid, methacrylic acid and crotonic acid; and N-phenylmaleinimide.

These comonomers may be used singly or in combination for copolymerization with styrene or its derivatives.

The content of the units of styrene or its derivatives in the copolymers is generally at least 65% by weight, preferably 75 to 98% by weight, more preferably 80 to 95% by weight, based on the weight of the copolymer, and the remainder may be composed of the units of the other comonomer.

Thus, specific examples of the styrene resin constituting the foamed sheet layer (a) include polystyrene, styrene/methyl methacrylate copolymer, styrene/acrylonitrile copolymer, styrene/maleic anhydride copolymer, styrene/acrylic acid copolymer, styrene/methacrylic acid copolymer, and styrene/N-phenylmaleinimide copolymer. They may be used either singly or as a blend of two or more of them. Suitable styrene resins are polystyrene, styrene/maleic anhydride copolymer, and styrene/N-phenylmaleinimide copolymer. Polystyrene is especially preferred.

The preparation of a foamed sheet from the styrene resin may be effected by methods known per se, for example the methods described in "Plastic Material", 10 [2] 33 (February 1969), and Japanese Patent Publication No. 6372/1964. One preferred method is specifically described below by way of example.

A polystyrene resin powder is fed from the hopper of an extruder having a gas feed opening provided in the barrel. The temperature of the barrel was set at about 160° to 190° C., and the polystyrene resin is melted. A blowing agent such as butane gas is introduced under a pressure of about 15 to 30 kg/cm$^2$ into the molten resin from the gas feed opening and the resin is fully kneaded. The die provided at the forward end of the extruder is kept at a temperature of about 140° to 160° C., and the kneaded mixture is extruded from the die and simultaneously expanded to form the desired foamed sheet.

The foamed sheet produced can generally have an expansion ratio of from 5 to 20, preferably from 10 to 15, and more preferably from 11 to 13. The suitable apparent density of the sheet (before lamination) is generally 0.211 to 0.053 g/cm$^3$, preferably 0.106 to 0.070 g/cm$^3$, more preferably 0.096 to 0.088 g/cm$^3$.

The "expansion ratio", as referred to herein, is defined as the quotient of the density of the unfoamed resin divided by the bulk density of the foamed resin. The density of the unfoamed resin varies with composition, and is generally in the range of 1.04 to 1.07 g/cm$^3$.

The thickness of the foamed sheet (before lamination) is not strictly restricted, and can be varied over a wide range depending upon the use, etc. of the final product. Generally, the suitable thickness will be about 2.0 to 5.0 mm, preferably 2.2 to 3.5 mm.

As required, the foamed sheet may contain usual amounts of additives, for example coloring agents such as cadmium yellow, quinacridone red, cobalt blue, cadmium red, red iron oxide, titanium oxide, zinc oxide and carbon black; fire retardants such as antimony oxide and chlorinated paraffin; fillers such as barium sulfate, lithopone, magnesium carbonate, calcium carbonate, silica, kaolin clay and talc; antioxidants; antistatic agents; and ultraviolet absorbers.

Reinforced Thermoplastic Resin Layer (b)

The reinforced thermplastic resin layer (b) is composed of a thermoplastic resin sheet reinforced with a mixture of glass fibers and organic fibers.

The thermoplastic resin used in the resin layer (b) is not particularly restricted, and may be any of ordinary thermoplastic resins. For example, in addition to the various styrene resins exemplifed for the foamed sheet layer (a), there can be used styrene/isoprene copolymer, styrene/butadiene copolymer, styrene/acrylonitrile/butadiene copolymer, polymethyl methacrylate, and polyacrylates (e.g., polymethyl acrylate). The same kind of resin as the resin constituting the foamed sheet layer (a) is especially preferred.

Glass fibers of the type usually employed for reinforcing resins may be used as a reinforcing material for such a thermoplastic resin, but long glass fibers are preferred. Suitable glass fibers have a length of generally 0.01 to 30 mm, preferably 0.1 to 15 mm, and a diameter of generally 3 to 20 microns, preferably 7 to 15 microns.

One great characteristic feature of this invention consists in using the glass fiber reinforcing material as a mixture with organic fibers. The organic fibers may be synthetic fibers or natural fibers. Suitable organic fibers have a softening point of generally at least 100° C., preferably at least 150° C. The "softening point" of the fibers are measured by a differential thermal analysis method.

Specific examples of the organic fibers that can be used in this invention include fibers prepared from synthetic resins, for example polyesters such as polyethylene terephthalate, polyamides such as nylon-6, nylon-66 and nylon-12, polyacrylonitrile, and polyvinyl formal; and natural fibers such as wool, silk, flax and cotton. These organic fibers may have a length of generally 5 to 20 mm, preferably 10 to 15 mm. The suitable diameter of the fibers is usually 2 to 10 denier, preferably 3 to 9 denier. The organic fibers may be in the form of a straight line, but generally, they are preferably crimped. Polyethylene terephthalate fibers and polyvinyl formal fibers can be especially advantageously used in this invention.

The reinforced thermoplastic resin sheet in accordance with this invention may be formed from the glass fibers and organic fiber described above by a known method for producing fiber-reinforced plastics (FRP). One preferred method, that can be used in this invention is to impregnate a fibrous web of a mixture of the glass fibers and organic fibers with the aforesaid thermoplastic resin. The fibrous web used in this method can be formed by using sheet-forming methods known per se (see, for example, "Shigyo Teian" (Proposals for Paper-Making) edited by Kiyohide Narita, published on Apr. 1, 1961 by Maruzen Co., Ltd., Japan). For example, it can be produced by spreading the glass fibers and organic fibers, dispersing them in water (at which time a surface-active agent may be added to the dispersion for promoting dispersing, and/or the dispersing may be promoted mechanically by means of a water flow pump), and passing the dispersed fibers through a screen of a suitable mesh size.

The mixing ratio of the glass fibers to the organic fibers may be varied over a wide range depending upon the use of the product of this invention, etc. If the proportion of the glass fibers becomes high, the heat moldability of the final laminate tends to be reduced. If the proportion of the organic fibers increases, the heat resistance of the final laminate tends to have reduced heat resistance and mechanical strength. Accordingly, the suitable weight ratio of the glass fibers to the organic fibers is generally from 8:2 to 2:8, preferably from 7:3 to 4:6, more preferably from 6.5:3.5 to 4.5:5.5.

Desirably, the mixed fibrous web prepared as above is partially bonded by means of a resin binder which softens at a temperature of less than about 140° C., preferably less than about 120° C. in order that at the time of heat molding the laminate of the invention, the foamed sheet layer (a) does not decrease in dimension under the effect of heat. Suitable resin binders include, for example, ABS resin, acrylic resins, cellulose acetate, cellulose propionate, polybutene, ethylene/vinyl acetate copolymer, polystyrene, polyvinyl chloride, vinyl chloride/vinyl acetate copolymer, SBR, NBR, polyvinyl acetate, and partially saponified polyvinyl acetate. These binders may be applied in the form of an aqueous emulsion, an organic solvent solution, etc. to the fiber web.

The reinforced thermoplastic resin sheet can be formed by impregnating the mixed fibrous web formed in this manner with the aforesaid thermoplastic resin. The impregnation of the thermoplastic resin in the mixed fibrous web can advantageously be achieved by impregnating the thermoplastic resin in the form of an emulsion into the fibrous web, squeezing the excess of the emulsion by a rubber roll or the like, and drying the web at about 100° to about 130° C.

According to another preferred method, the reinforced thermoplastic resin sheet can be produced by impregnating a sheet or mat of the glass fibers with an emulsion of the thermoplastic resin having the organic fibers dispersed therein, or impregnating a nonwoven web of the organic fibers with an emulsion of the thermoplastic resin having the glass fibers such as milled fibers dispersed therein, removing the excess of the emulsion, and drying the web at a temperature of about 100° to about 130° C. The mixing ratio between the glass fibers and the organic fibers at this time may be within the same range described above for the mixed fibrous web.

The ratio of the thermoplastic resin to the fibrous mixture in the thermoplastic resin sheet reinforced with the fibrous mixture can be varied over a considerably wide range depending upon the properties required of the final product, etc. Generally, the weight ratio of the thermoplasic resin to the fibrous mixture is conveniently from 1:1 to 5:1, preferably from 2:1 to 4:1, more preferably from 3:1 to 3.5:1.

The thickness of the reinforced thermoplastic resin sheet (before lamination) can be varied depending upon the end use of the resulting laminate, etc. Generally, it can be 0.1 to 0.4 mm, preferably 0.25 to 0.35 mm.

Formation of the Laminate

The laminate of this invention can be formed by laminating the fiber blend-reinforced thermoplastic resin sheets to both surfaces of the foamed styrene resin sheet into a unitary structure. The sheet lamination may be carried out in accordance with known methods for producing resin laminates, for example by superimposing the reinforced thermoplastic resin sheets on both surfaces of the formed styrene resin sheet and consolidating them under heat and pressure. The heating and pressurizing conditions may vary depending upon the resins constituting the respective sheets. Generally, the heating temperature is in the range of 90° to 140° C., and the pressure is 0.01 to 0.03 kg/cm$^2$.

The proportions of the foamed resin sheet layer (a) and the reinforced resin layer (b) in the laminate of this invention are not particularly restricted, and can be varied depending upon the properties required of the laminate, for example. If the proportion of the reinforced resin layer (b) is small, the resulting laminate has low strength and heat resistance and is easily deformed under heat. On the other hand, if it is large, the laminate is difficult to mold under heat, and during the molding, the foamed sheet layer (a) tends to decrease in size or buckle. Conveniently, therefore, the weight ratio of the two reinforced resin layers (b) to the foamed sheet layer (a) is generally from 1:2 to 2:1, preferably from 1:1 to 1.5:1.

The laminate of this invention has a structure in which thermoplastic resin layers reinforced with a mixture of glass fibers and organic fibers are laminated to both surfaces of a foamed styrene resin sheet. Accordingly, it is light in weight and has high mechanical strength charactristics such as flexural strength and specific rigidity. Furthermore, it has excellent heat resistance and thus resistance to heat deformation. Its molding under heat can be carried out by only heating the surface layers, i.e. the thermoplastic resin layers reinforced with a mixture of fibers, and therefore, the heat molding is easy. To release the molded product from the mold, it is necessary just to cool only the surface layers of the product, and the molding cycle can be shortened.

The laminate of this invention can be easily molded, for example, by pre-heating it to about 90° to about 140° C., and then pressing it by means of a matched die heated at about 50° to about 70° C.

Accordingly, when the laminate of the present invention is used as a core material of a ceiling liner of automobiles, etc., it does not sag even when the inside of an automobile attains a reduced pressure condition at high temperatures or during running. In using the laminate of this invention as a core material of a ceiling liner of automobiles, etc., it is possible and preferable to mold the laminate into a suitable shape and then laminate a vinyl chloride resin leather or a foraminous foamed resin sheet as a surface material to at least one surface of the molded laminate.

The following examples further illustrate the present invention.

1. Preparation of a Mixed Fibrous Web

The following materials were used.
A. Long glass fibers [diameter 7 microns, length 13 mm; GLASSLON CHOPPED STRAND KS-13 (a product of Asahi Fiberglass Co., Ltd.)]
B. Polyethylene terephthalate fibers [diameter 6 denier, length 12 mm, with W-shaped crimps; Kuraray Polyester CED 205 (a product of Kuraray Co., Ltd.)]
C. Polystyrene emulsion [solids concentration 50% by weight, softening temperature 100° C.; KUROSUREN PL-100G (a product of Takeda Chemical Co., Ltd.)]

Eighteen grams of the long glass fibers and 9 g of the polyethylene terephthalate fibers were put in 90 liters of water, and in a cylindrical container having a diameter of 60 cm and a height of 60 cm, the two fibers were spread and dispersed in water. Prior to the spreading operation, 50 g of Nonion NS-708 (a trade name for a nonionic emulsifier manufactured by Nippon Oils and Fats Co., Ltd.) had been added to water to promote dispersion, and 5 g of Disfoam (a trade name for a defoamer manufactured by Nippon Oils and Fats Co., Ltd.) had also been added to inhibit foaming of the dispersion.

To promote the spreading and dispersing of the fibers mechanically, a jet water stream by a water flow pump was used. The water stream was supplied to the cylindrical vessel from its bottom and discharged tangentially from its middle body portion.

After continuing the spreading and dispersing operation for about 1 hour, the supplying of the jet stream was stopped. Immediately then, the dipsersed fibers were drawn from the water onto a stainless steel screen having a diameter of 30 cm. The openings of the screen had a size of 40 mesh. The polystyrne emulsion was sprayed onto the wet web by a spray gun, and the wet web as carried on the screen was put into a dryer to bind the fibers by the polystyrene emulsion. The drying temperature was 110° C., and the drying time was 30 minutes. Then, the screen was taken out from the dryer and allowed to cool in air for 15 minutes. The resulting web of the glass fibers and the polyethylene terephthlate fibers was peeled off from the screen. The resulting web had a weight of 27.5 g/m$^2$, and when the polystyrene binder was extracted from it at room temprarture by using a mixture of 80% of toluene and 20% of n-hexane, there was a decrease of 2.2 g/m$^2$ in weight. When after extraction of the polystyrene binder, the web was burnt in an electrical furnace at 700° C. for 15 minutes, the glass fibers alone (16.2 g/m$^2$) remained.

In summary, the mixed fibrous web prepared by the foregoing operation had the following composition.

| Component | Weight (g/m$^2$) | Weight (%) |
| --- | --- | --- |
| Long glass fibers | 16.2 | 58.9 |
| Polyethylene terephthalate fibers | 9.1 | 33.1 |
| Polystyrene binder | 2.7 | 8.0 |
| Total | 27.5 | 100.0 |

2. Preparation of a Thermoplastic Resin Layer Reinforced with the Mixed Fibrous Web The mixed fibrous web prepared as in 1 above was immersed in a polystyrene emulsion (a product of Takeda Chemical Co., Ltd.) having a solids concentration of 50% by weight, and when the emulsion was impregnated in the web, the web was held by two rubber rolls to sqeeze out the excess of the emulsion. The emulsion had a viscosity of 80 cps. The distance between the rubber rolls was 0.15 mm. The rubber rolls each had a diameter of 12 cm and were rotated at a speed of 20 rpm.

The wet fibrous web impregnated with the emulsion was spread on a Teflon-coated iron plate and dried at 120° C. for 5 minutes.

The resulting mixed fiber-reinforced thermoplastic resin layer had a weight of 109.8 g/m², a tensile modulus of $2.7 \times 10^3$ (at 120° C.) and an elongation of 45% (at 120° C. The weight ratio of the impregnated resin to the mixed fibrous web was 3.0:1, and the weight ratio of the glass fibers to the polyethylene terephthalate fibers was 1.7:1.

The tensile properties were measured in accordance with ASTM D638-68(standards of evaluation of the tensile properties of plastics). The measuring temperature was 120° C. which has to do with the moldability of the mixed fiber-reinforced thermoplastic resin. The test piece used had a thickness of 0.23 mm, and the shape of the test piece was type IV. The elongation was a value (in percentage) obtained by dividing the reading on the measuring instrument by the length of the narrow portion of the test piece.

3. Preparation of a Thermoplastic Resin Layer Reinforced with the Mixture of Fibers by a Different Method To 100 parts by weight of the same polystyrene emulsion as used in 1 above was added 23.5 parts by weight of glass fibers having a length of 0.5 mm and a diameter of 10 microns (Milled Fiber MF-13, a trade name for a product of Asahi Fiberglass Co., Ltd.). They were well stirred to disperse the glass fibers uniformly in the emulsion. The emulsion initially had a viscosity of 100 cps which increased to 3840 cps after mixing of the glass fibers.

The resulting suspension was impregnated in a nonwoven fabric of polyethylene terephthalate fibers by means of a reverse coater. The basis weight of the nonwoven fabric was 19.5 g/m². The rolls of the reverse roll coater had a diameter of 15 cm and were spaced from each other by a distance of 0.13 mm. The rotating speed of the rolls was 10 rpm.

The impregnated nonwoven fabric was dried by the same method and under the same conditions as in 2 above.

The resulting fiber-reinforced thermoplastic resin layer had a thickness of 0.25 mm, a weight of 111.3 g/m², a tensile modulus of $2.5 \times 10^3$ (at 120° C.), and an elongation of 64% (at 120° C.). The weight ratio of the impregnated resin to the polyester fibers and glass fibers combined was 1.3:1, and the weight ratio of the glass fibers to the polyester fibers was 1.5:1.

The above method in 3 has the advantage that the distribution of the dispersing of the two fibers is uniform, and the fibers do not esily break during handling. In contrast, the method described in 2 above has the advantage that the content of the glass fibers can be increased.

4. Preparation of a Laminate

Fiber-reinforced thermoplastic resin layers prepared as in 3 above were laminated to both surface of a foamed polystyrene sheet and the assembly was hot-pressed. The foamed polystyrene sheet was "S-len Foam Sheet" (made by Sekisui Chemical Co., Ltd.) having a basis weight of 213 g/m² and a thickness of 2.5 mm.

The temperature of the hot plate of the hot press was set at 115° C. in the hot pressing operation.

As a mold releasing material, an aluminum plate having a thickness of 1 mm and coated with Teflon was used. To obtain the desired laminate thickness, a spacer having a thickness of 4.5 mm was used. The pressing time was 3 minutes. After the lapse of three minutes, the product was transferred together with the molding material to a cooling press, and cooled for 2 minutes while pressing.

The resulting laminate had a thickness of 4.55 mm.

5. Molding

The laminate prepared in 4 above was molded.

Prior to the molding, the laminate was heat-softened at 125° C. for 2 minutes in an air oven, and then molded by a circular matched die. The die temperature was 56° C., and after molding, the product was held in the die for 30 seconds and then withdrawn from it. The pressure during the molding was 0.05 kg/cm² upon the projected surface of the die.

What we claim is:

1. A reinforced laminate comprising
   (a) a foamed styrene resin sheet layer, and
   (b) thermoplastic resin layers reinforced with a mixture of glass fibers and crimped organic fibers and laminated on both surfaces of the sheet layer (a).

2. The laminate of claim 1 wherein the foamed styrene resin sheet is a foamed polystyrene sheet.

3. The laminate of claim 1 wherein the glass fibers are long fibers.

4. The laminate of claim 1 wherein the mixing ratio of the glass fibers to the organic fibers is from 8:2 to 2:8 by weight.

5. The laminate of claim 1 wherein the fiber mixture is in the form of a mixed fibrous web of the glass fibers and the organic fibers.

6. The laminate of claim 5 wherein the mixed fibrous web is partially bonded by a resin binder having a softening point of less than about 140° C.

7. The laminate of claim 5 wherein the thermoplastic resin layers are each formed by impregnating the mixed fibrous web with an emulsion of a thermoplastic resin.

8. The laminate of claim 1 wherein the weight ratio of the thermoplastic resin to the fiber mixture in the layers (b) is from 1:1 to 5:1.

9. The laminate of claim 1 wherein the weight ratio of the foamed sheet layer (a) to the thermoplastic resin layers (b) is from 1:2 to 2:1.

10. A molded article prepared from the laminate of claim 1.

11. A core material of a ceiling liner of an automobile, said core material being composed of the laminate of claim 1.

12. A reinforced laminate comprising
    (a) a foamed styrene resin sheet layer, and
    (b) thermoplastic resin layers reinforced with a mixture of glass fibers and organic fibers and laminated on both surfaces of the sheet layer (a), said thermoplastic resin layers being each formed by impregnating a nonwoven web of the organic fibers with an emulsion or a thermoplastic resin having the glass fibers dispersed therein.

13. The laminate of claim 12 wherein the foamed styrene resin sheet is a foamed polystyrene sheet.

14. The laminate of claim 12 wherein the glass fibers are long fibers.

15. The laminate of claim 12 wherein the organic fibers are crimped fibers.

16. The laminate of claim 12 wherein the mixing ratio of the glass fibers to the organic fibers is from 8:2 to 2:8 by weight.

17. The laminate of claim 12 wherein the fiber mixture is in the form of a mixed fibrous web of the glass fibers and the organic fibers.

18. The laminate of claim 17 wherein the mixed fibrous web is partially bonded by a resin binder having a softening point of less than about 140° C.

19. The laminate of claim 17 wherein the thermoplastic resin layers are each formed by impregnating the mixed fibrous web with an emulsion of a thermoplastic resin.

20. The laminate of claim 17 wherein the weight ratio of the thermoplastic resin to the fiber mixture in the layers (b) is from 1:1 to 5:1.

21. The laminate of claim 17 wherein the weight ratio of the formed sheet layer (a) to the thermoplastic resin layers (b) is from 1:2 to 2:1.

22. A molded article prepared from the laminate of claim 12.

23. A core material of a ceiling liner of an automobile, said core material being composed of the laminate of claim 12.

* * * * *